United States Patent [19]

Moller

[11] 3,977,087
[45] Aug. 31, 1976

[54] GYRO SYSTEM RAPID ACTIVATION UTILIZING LAST KNOWN POSITION OF GYRO

[75] Inventor: Jan Kuno Moller, North Caldwell, N.J.

[73] Assignee: AGA Corporation, Secaucus, N.J.

[22] Filed: Sept. 6, 1974

[21] Appl. No.: 503,649

Related U.S. Application Data

[63] Continuation-in-part of Ser. No. 276,924, Aug. 1, 1972, abandoned.

[52] U.S. Cl. ................................ 33/318; 33/324
[51] Int. Cl.² .......................................... G01C 17/00
[58] Field of Search ...................... 33/324, 320, 318

[56] References Cited
UNITED STATES PATENTS 3,577,646  11/1967  Eklund .................................. 33/324
3,806,865  4/1974  Stephan ................................ 33/318

FOREIGN PATENTS OR APPLICATIONS 1,915,477  10/1965  Germany .............................. 33/320

*Primary Examiner*—William D. Martin, Jr.
*Attorney, Agent, or Firm*—Lerner, David, Littenberg & Samuel

[57]  ABSTRACT

A gyro system is disclosed in which the system is brought from an "off" position back to full operating speed and known orientation in a short time without requiring any external signal for orientation verification. A fast start procedure is disclosed in which the last known position is employed as the actual starting position of the gyro as well as an aligned procedure in which the last known position is employed as a reference point for faster alignment.

5 Claims, 2 Drawing Figures

GYRO SYSTEM RAPID ACTIVATION UTILIZING LAST KNOWN POSITION OF GYRO

This is a continuation-in-part of my copending patent application, Ser. No. 276,924 which was filed on Aug. 1, 1972 and entitled GYRO SYSTEM RAPID ACTIVATION UTILIZING LAST KNOWN POSITION OF GYRO, now abandoned.

FIELD OF THE INVENTION

This invention relates to gyros and particularly to apparatus and method for aligning the same.

BACKGROUND OF THE INVENTION

This invention pertains to a gyro orienting system in which a quick start device to bring the gyro up to speed and known orientation is essential because resort to reliable external magnetic signals or any other reliable external signals is virtually impossible. The field of invention exists because in modern warfare many self-propelled vehicles such as tanks, weapons carriers, boats, ships, planes, rocket launchers, jeeps, artillery and the like are operated over unfamiliar terrain and under extremely difficult navigational conditions caused by weather and hostile or friendly military action which may not only destroy known landmarks but through the use of atomic weapons reorient local magnetic fields.

In addition, because of the confusion involved in battle and the possibility that an enemy could attempt to disorient crews of such self-propelled devices, no resort can be had to external navigational aids such as radio signals and the like. Therefore, a navigational system for such a self-propelled device must have a fixed reference contained within itself. Because such vehicles disturb the accuracy of magnetic readings in their immediate vicinity a magnetic compass is unsuitable to use as the fixed reference. In addition, local magnetic variations and the possibility of atomic warfare creating magnetic disturbance make magnetic compass readings both within and without the vehicles excessively unreliable.

The range of self-propelled military vehicles and the like is generally quite limited because the space available for carrying fuel safely is very limited and because a large portion of the vehicle's payload is devoted to its principal mission of being a weapons carrier. Accordingly, when the vehicle is not actually in operation its electrical system must be shut down to conserve fuel. When such a vehicle is de-energized the gyro orienting system is also turned off. Naturally, when the vehicle has to move great danger can attend any delay in its motion because of the risk of hostile enemy infantry, air and artillery attacks.

There are gyro systems which initially orient themselves by use of a ballistic pendulum. These devices are quite accurate but, when turned off, tend to disorient themselves while running out and require a minimum of 15 to 20 minutes to reorient themselves.

BRIEF DESCRIPTION OF THE INVENTION

With these and other objects in view, the present invention contemplates a system for orientation of an indicating system which includes a movable platform, a gyro compass mounted to move with said platform, and having gyro sensing means to sense the orientation of a portion thereof with respect to said platform, apparatus rendered effective by de-energization of said gyro compass for storing information indicating the last position of said gyro compass prior to de-energization and apparatus for driving the gyro compass upon re-energization thereof to a position corresponding to the information stored upon the de-energization.

DESCRIPTION OF THE DRAWINGS

For a more complete understanding of the invention reference should be made to the following detailed description of the invention and drawings in which.

DETAILED DESCRIPTION OF THE INVENTION

Figure 1:
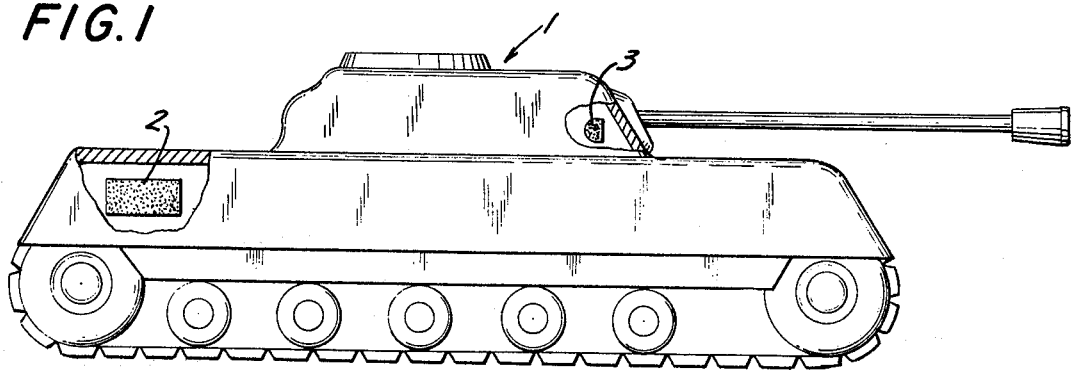
FIG. 1 shows an example of an armored military vehicle which carries its own magnetic field and which may operate in conditions which will prohibit the occupants from getting accurate position information. Part of FIG. 1 is broken away and in section to show a gyro orienting system and a display device for the orienting system.

FIG. 1 shows a longitudinal side view of a tank 1 partially broken away and in section to show the location of a gyro orienting system 2 for the tank and a display device 3 shown within the operator's section of the tank 1.

Figure 2:
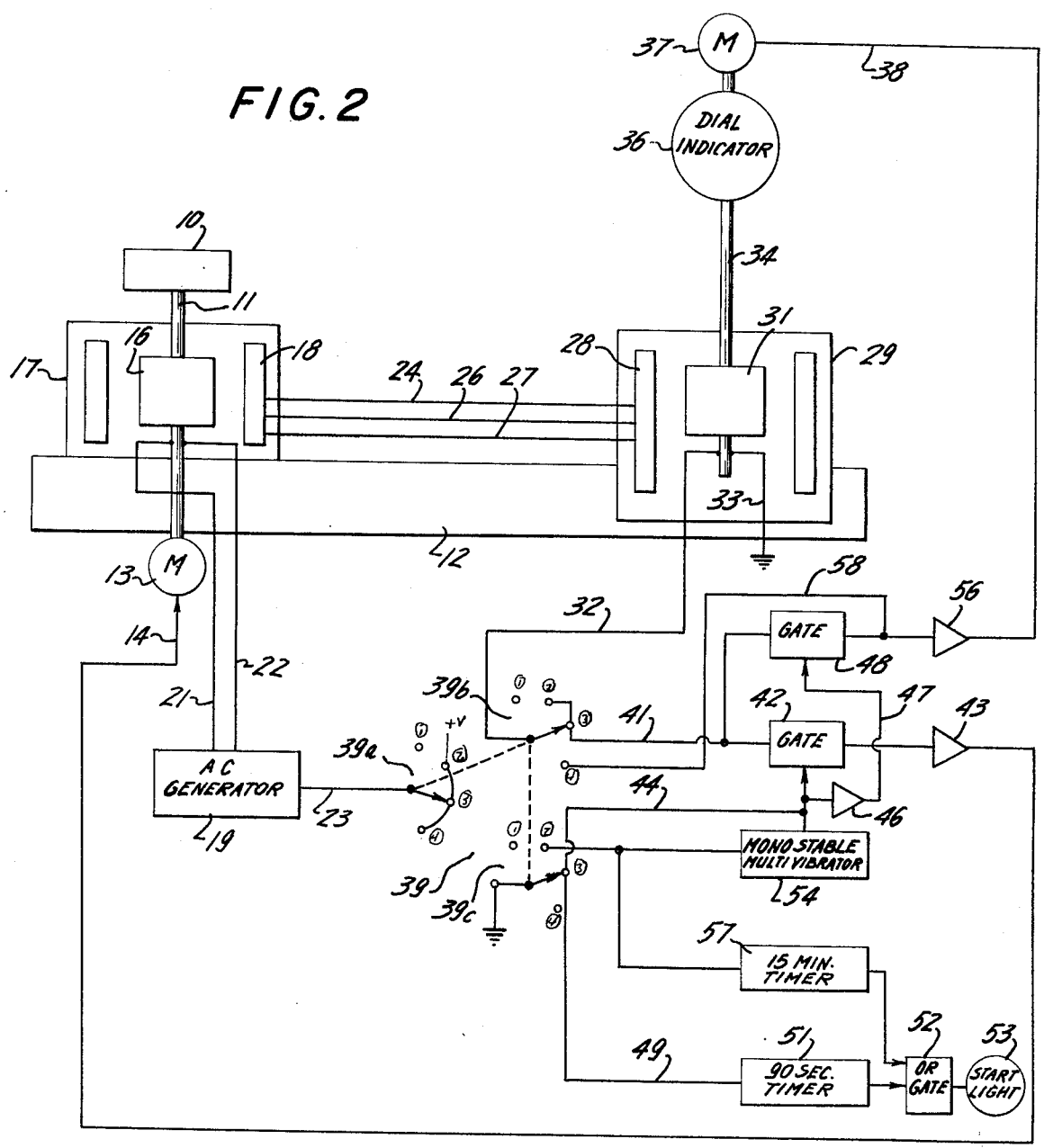
FIG. 2 is a schematic diagram showing an electromechanical embodiment of this invention.

Referring now to FIG. 2, we see an electromechanical schematic diagram of a system embodying the principles of this invention, in which a gyro compass having a portion 10 controls an output shaft 11 for indicating direction. A portion of the gyro compass 10 upon alignment continues to maintain a predetermined orientation. Movement of the portion of the gyro compass 10 moves the shaft 11 to follow therewith. The shaft 11 is mounted for rotation with respect to a platform 12. The shaft 11 is connected to a servo motor 13. A signal on a lead 14 will activate the motor 13 with direction of rotation and speed dependant upon the amplitude and phase of this signal related to the voltage from AC generator 19, which energizes the field windings of motor 13.

The shaft 11 also carries a rotor coil 16 of a position sensor 17. The position sensor 17 also has a set of stator coils 18. The position sensor 17 is mounted so that the stator coils 18 are fixed in a position with respect to the platform 12 while the rotor coil 16 is free for movement with the shaft 11.

An A.C. generator 19 provides an A.C. voltage signal on a pair of leads 21 and 22 when a positive voltage is applied on an input lead 23. The leads 21 and 22 are connected to slip rings mounted on the shaft 11 which apply the signal from the A.C. generator to the rotor coil 16. The stator coils 18 have three coils therein which provide output signals on leads 24, 26 and 27, depending upon the angular orientation of the rotor coil 16 with respect to the stator coils 18.

The leads 24, 26, 27 are connected to a stator coil 28 which is part of a indicator drive 29 similar to the position sensor 17. The device 29 also has a rotor coil 31. The device 29 is connected to the dial indicator 36. The signals applied by the leads 24, 26 and 27 energize the stator coil 28 of the indicator drive 29 which induces a signal in the rotor coil 31 provided on a lead 32. The signal from the coil 31 is provided to the lead 32 by slip rings with one of the slip rings grounded by a lead 33. The amplitude and phase of the signal on the lead 32 is depending upon the orientation of the rotor coil 31 with respect to the stator coil 28. When the rotor coil 31 is oriented with respect to the stator coil 28 in the same fashion as the rotor coil 16 is related to the stator coil 18, a null signal is present on the lead 32. The rotor coil 31 rotates on a shaft 34 which also carries therewith a dial indicator 36 for visually indicating the orientation of the rotor coil 31 and, therefore, the rotor coil 16 and a portion of the gyro compass 10. A servo motor 37, field energized from A.C. generator 19, is connected to the shaft 34 to drive the same upon receipt of a displacement signal supplied upon a lead 38.

A multi-positioned ganged switch 39 having three banks 39a, 39b and 39c interconnect the elements discussed above in four modes. The first mode is the "off" mode in which the wipers of the switch 39 are connected to the first position of the respective banks indicated by the numerical 1 next to the contact thereof. This is the "off" position in which the A.C. generator 19 is de-energized (and also the gyro compass) and the signal from the lead 32 is not applied to any other circuitry. When the vehicle shown in FIG. 1 is brought to rest and de-energized, the switch 39 is thrown to this first position to conserve power and all systems are de-energized. At this time the gyro compass 10 winds out and disorients. This is inherent in the operation thereof.

Upon re-energization of the vehicle shown in FIG. 1, it is necessary to reorient the gyro compass before it can serve as a navigational aid for the vehicle 1.

In accordance with the teachings of this invention, two modes of reorientation of the gyro compass are provided. If it is necessary to immediately start up the vehicle, the switch 39 is thrown to the position where each of the wipers are as shown in FIG. 2 in position 3. In this mode a voltage + V is applied by the wiper of bank 39a to the lead 23, energizing the A.C. generator 19 to provide an A.C. signal to the leads 21 and 22 to the coil 16 thereby impressing signals on leads 24, 26 and 27 which ultimately provide a position signal on the lead 32 indicating the relative angular positions of the shafts 11 and 34. The signal on the lead 32 is passed by the wiper of bank 39b via contact 3 to a lead 41 gate 42, amplifier 43, and lead 14 to activate the motor 13 orienting the shaft 11 and, therefore, the portion of the gyro compass 10 and coil 16 to correspond with the position of the shaft 34. In this way, it is seen that the start-up procedure in this mode employs the inertia of the dial indicator 36 and other inertia associated with members on the shaft 34 as a memory to reorient the gyro compass 10 to the last position of the gyro compass 10 prior to de-energization. It is important that the start-up of the system shown in FIG. 2 does not disorient the shaft 34 or else this information would be lost.

In this regard, it should be noted that the third bank, 39c of the switch 39, provides a ground signal via lead 44 to the input of gate 42 to ensure operation thereof and an inverting amplifier 46 provides an inhibit signal via lead 47 to a gate 48. The third bank of 39c of the switch 39 also provides a signal via lead 49 to a 90 second timer 51 which provides a signal 90 seconds after energization. In this way, the start light 53 indicates to the operator that the gyro compass is oriented to the last position and that operation can begin.

In accordance with a further aspect of this invention, if time permits, a more accurate alignment can be achieved of the gyro compass in a shorter time than has been previously possible. This is accomplished by throwing the switch 39 to the position in which the wipers engage the contacts numbered 2. As with the fast start mode of operation, the voltage + V energizes the A.C. generator 19 to ultimately provide the position signal on the lead 32. Again, the bank 39b provides the signal from the lead 32 via lead 41 to the gate 42. The bank 39c initiates operation of a monostable multivibrator 54 which supplies a ground signal to the gate 42 for approximately 90 seconds, thereby passing the signal from the lead 32 for that interval of time via amplifier 43 and lead 14 to the motor 13. In this way, the portion 10 of the gyro compass is oriented in accordance with the last position of the shaft 34. As before the amplifier 46 inverts the signal going to the gate 42 and inhibits the gate 48 during this 90 second interval. At the end of the 90 second interval, the monostable multi-vibrator 54 ceases to provide the ground signal to the gate 42 thereby inhibiting the gate 42 from further passing the signal on the lead 32. The inverting amplifier 46 thereupon supplies the ground signal via lead 47 to the gate 48 passing the signal on lead 32 (and lead 41) through the gate 48 and amplifier 56 and lead 38 to activate the motor 37. In this way, a signal on the lead 32 no longer reorients the portion 10 of the gyro compass but rather now drives the dial indicator to indicate changes in position of the portion 10 of the gyro compass. Bank 39c of the switch 39 is connected to a 15 minute timer 57 which illuminates the start light 53 via or gate 52 after 15 minutes have elapsed. It is seen that in this mode of operation the portion 10 of the gyro compass is brought in the first 90 seconds to the last position of the dial indicator 36 (shaft 34) and then allowed an additional 13½ minutes to find its true position moving the dial indicator 36 to track therewith. In this way, the portion 10 of the gyro compass is brought quickly to a position which is close to its true position and allowed to then more quickly align itself. The operator is given an indication after 15 minutes that the start-up procedure has been completed.

After either of the procedures outlined above are completed (when the start light 53 lights up) the switch 39 is thrown to its fourth position. In this position, the A.C. generator is activated by a +V voltage, the output on the lead 32 is supplied directly via lead 58 to the amplifier 56 to activate the motor 37.

It should be appreciated that the use of the last position of the portion 10 of the gyro compass prior to de-energization for an initial start-up position enables beginning of operation within a minute and a half of reenergization on an operational basis. Of course, the waiting of the 15 minutes for self alignment after this process, provides a more accurate initial heading. It should be appreciated that the use of the last position provides more rapid start-up even in the more accurate alignment mode.

While this invention has been described with respect to a particular embodiment thereof, numerous others will become obvious to those of ordinary skill in the art in light thereof.

What is claimed is:

1. In an orientation indicating system:
a movable platform;
a gyro mounted (to move with and having a portion for rotation) to rotate with respect to said platform;
means for selectively energizing and de-energizing said gyro;
means for sensing the orientation of said gyro with respect to said movable platform;

means rendered effective by deenergization of said gyro for storing information including the last orientation of said portion of said gyro with respect to said movable platforms; and means for driving of said gyro upon re-energization thereof to an orientation corresponding to said stored information indicating the last orientation of said gyro.

2. In an orientation indicating system as defined in claim 1 also including:

means for indicating that said driving means has operated for a first predetermined period of time.

3. In an orientation indicating system as defined in claim 2 also including:

means responsive to said driving means operating for a second predetermined period of time for deactivating said driving means; said second predetermined period of time being less than said first predetermined period of time.

4. In an orientation indicating system as defined in claim 3 also including:

means responsive to said driving means operating for said second predetermined period of time for driving said storing means in accordance with the orientation of said gyro.

5. In an orientation indicating system as defined in claim 1 in which said storing means employs mechanical inertia of an indicator for a memory.

* * * * *